United States Patent [19]
Plegat

[11] 3,805,654
[45] Apr. 23, 1974

[54] FEELING DEVICE APPARATUS FOR CUTTING TUBULAR ELEMENTS FROM A CONTINUOUSLY ADVANCING TUBE

[75] Inventor: Alain Edouard Plegat, Asnieres, France

[73] Assignee: Societe Anonyme Des Usines Chausson, Asnieres, France

[22] Filed: Oct. 27, 1971

[21] Appl. No.: 193,004

[30] Foreign Application Priority Data
Nov. 2, 1970  France ............................. 70.39382

[52] U.S. Cl. .................... 83/294, 83/319, 83/320
[51] Int. Cl. ......................................... B23d 25/04
[58] Field of Search ................... 83/294, 319, 320

[56] References Cited
UNITED STATES PATENTS
| | | | |
|---|---|---|---|
| 1,498,550 | 6/1924 | Johston ................................ | 83/319 |
| 2,540,166 | 2/1951 | Frank et al. ....................... | 83/319 X |
| 2,582,025 | 1/1952 | Frank et al. ....................... | 83/319 X |
| 2,019,465 | 10/1935 | Rubin ............................... | 83/319 X |
| 3,292,472 | 12/1966 | McKenica............................ | 83/319 |
| 2,746,126 | 5/1956 | Talbot.............................. | 83/318 X |

*Primary Examiner*—J. M. Meister
*Attorney, Agent, or Firm*—Imirie and Smiley

[57] ABSTRACT

The device comprises a reciprocating motion carriage on which is placed a cutting device through which is passing the tube. A releasable feeling device is placed on the path of the tube and controls reversing of the carriage. The carriage supports a jack for operating the cutting device and of which feeding is controlled by an element placed on the carriage and cooperating which an adjustable stop.

5 Claims, 1 Drawing Figure

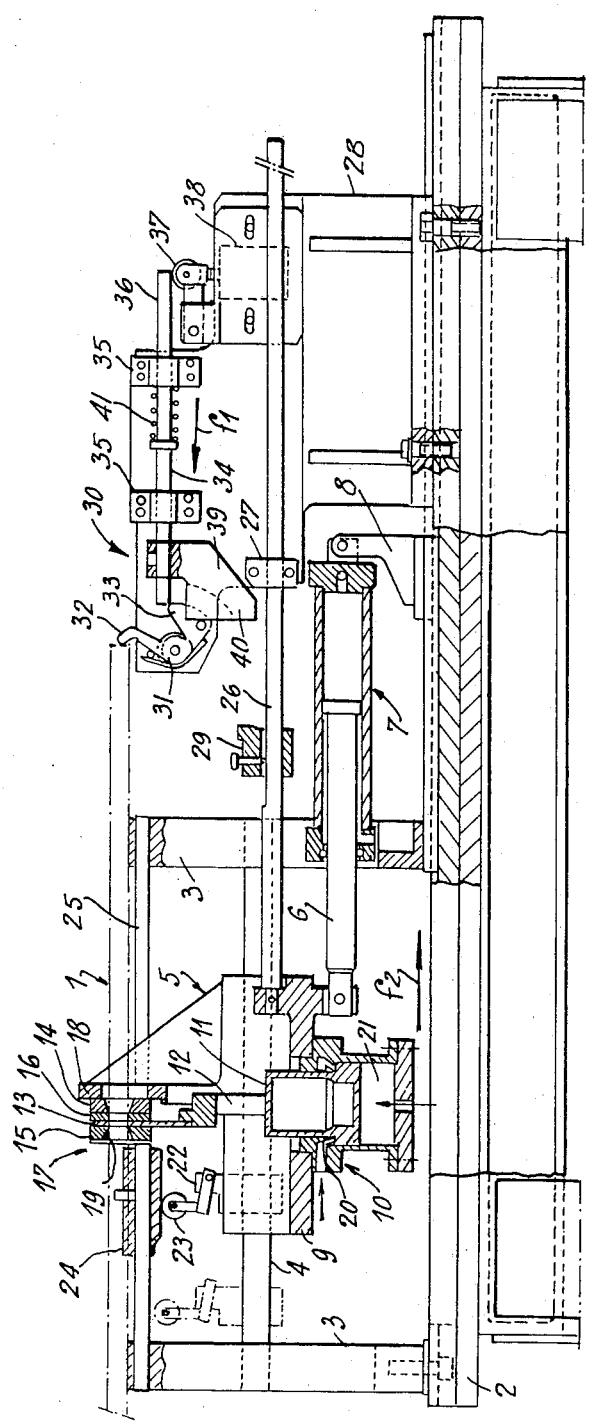

FEELING DEVICE APPARATUS FOR CUTTING TUBULAR ELEMENTS FROM A CONTINUOUSLY ADVANCING TUBE

In many technical fields, and more particularly in the manufacture of radiators for vehicles, tubular elements are used and they must have exactly the same lengths for a given type of manufacture. In order to make said tubular elements, continuous and high speed operating machines are used for manufacturing a tube which is then cut into portions by a cutting device.

Most of said devices presently utilized enable only a small setting of the length of the portions of cut tubular elements. It is then mandatory to use a particular device for every type of manufacturing, which requires many handling and setting operations.

The present invention copes with this disadvantage by creating a device enabling to set the lengths of the portions of cut elements in the size of the main types of manufacturing without requiring long and difficult operations nor replacing or changing some constitutive parts of the device.

According to the invention, the feeling device apparatus for cutting tubular elements from a continuously advancing tube, comprises a carriage having a reciprocating motion and supporting a cutting device through which the tube is continuously advancing and on the path of which is placed a releasable mechanism for reversing the feeding of a component driving the carriage which supports a jack for operating the cutting device and of which the feeding is regulated by a control component supported by the carriage to cooperate during its reciprocating motion with a stop having an adjustable position.

Other characteristics of the invention are shown in the following detailed description.

An embodiment of the invention is shown by way of none restrictive example in the accompanying drawing.

The only FIGURE is a longitudinal sectional view of the device of the invention.

The device shown on the drawing is designed to be placed at the end of a machine (not represented) providing manufacturing or only continuous feeding of a tube 1 shown in mixed lines. Said device comprises a frame 2 supporting two transverse cheeks 3 maintaining sliding guides 4 for supporting and guiding a sliding carriage 5. Said carriage 5 is connected to the piston rod 6 of a double-action jack 7 supported by a bracket 8 which is preferably set in an adjustable position on the frame 2. The sliding carriage 5 forms in the median part thereof, a base 9 for suspending a double-action jack 10 of which the piston 11 passes through the base 9 and is extended beyond said base by a rod 12. Said rod 12 supports a blade or shears 13 placed with soft sliding between a face 14 and a counter-face 15 possibly joined to a tightening gripper 16 to constitute a cutting device 17 supported by a crosshead 18 of the carriage 5. The cutting device 17 is placed according to the path direction of tube and, at least, the counter-face 15 delimits a guiding and engaging space 19 with divergent edges of which the smallest section corresponds substantially to the section of tube 1.

The double-action jack 10 includes a chamber 20 permanently fed with a fluid under pressure and a chamber 21 cyclically fed by a fluid which can be at same pressure as the fluid in chamber 20 due to the difference of the piston surfaces in both said chambers. Feeding of the double-action jack 10 is controlled through a valve 22 supported by the sliding carriage 5. A roller 23 of the valve 22 cooperates with an adjustable stop 24 placed on a rod 25 supported by cheeks 3 to extend in parallel with the sliding guides 4.

The base 9 of the sliding carriage 5 also supports a bar 26 guided into a bearing 27 provided on a support 28 which is placed in an adjustable way on the base 2. The bar 26 is provided with a block 29, axially adjustable and designed to cooperate with a releasing-setting releasable mechanism 30 placed on the support 28. Said mechanism 30 includes a feeling device 31 forming a finger 32 placed on the path direction of tube 1 and a stopping shoulder 33 placed in front of the end of a resiliently returning push-rod 34. Said push-rod 34 is placed into bearings 35 placed on support 28 to let its end portion 36 opposite to the feeling device 31 to cooperate with roller 37 of a valve 38 feeding the double-action jack 7. The push-rod 34 also supports a stop 39 between the bearings 35 and feeling device 31, said stop 39 is axially adjustable and its front portion 40 is placed on the path direction of block 29.

The above described device operates as follows:

A tube 1 is engaged into guiding and engaging space 19 to pass through the cutting device 17 of the sliding carriage 5 which is placed in the position corresponding to the position of the valve 22 shown in mixed lines; in said position the double-action jack 7 is in extension, push-rod 34 being stopped by the feeling device 31.

In such a position, the valve 22 provides the feeding of the double-action jack 7 to let piston 11 to be in the lower position thereof, whereby the blade or shears 13 leaves free the path followed by tube 1.

when tube 1, which is continuously running, reaches the finger 32, the swivelling of the feeling device 31 is controlled against the action of its return device. The stopping shoulder 33 releases the push-rod 34 which is moved in the direction of arrow $f_1$ by the resilient component 41. The end portion 36 releases the roller 37 whereby the valve 38 reverses feeding in the double-action jack 7 of which the piston rod 6 drives the sliding carriage 5 in translation according to the direction of arrow $f_2$. The roller 23 of valve 22 is then brought into contact with the stop 24, thus reversing the feeding of the jack 10 of which the piston 11 is pushed upwards. The position of the stop 24 is determined in function of the length of the tubular elements having to be cut in order that the reversing in the feeding of the double-action jack 10 occurs at the moment when the sliding carriage 5 is moved at a linear speed equal to the advance speed of the tube 1. Consequently, no relative motion occurs between tube 1 and carriage 5 when shears 13 is controlled by piston 11 to cause the cutting of the portion of tube 1 having passed beyond the cutting device 17.

Following the above described cutting step, carriage 5 keeps moving in the direction of arrow $f_2$ whereby the block 29 is brought into contact with the front portion 40 of the stop 39 to move the push-rod 34 in the opposite direction to arrow $f_1$. Said push-rod 34 releases the feeling device 31 which returns to its initial position and also operates roller 37 of the valve 38 reversing the feeding of the double-action jack 7. The sliding carriage 5 is then engaged in its return stroke in the opposite direction to arrow $f_2$, in other words, in the direction opposite to the advance direction of the tube 1 passing through the cutting device 17. It is to be noted that said operation is made possible due to the fact that just before return of the carriage 5 into the direction opposite to the direction of arrow $f_2$ the roller 23 of valve 22 has been released from the stop 24 whereby the feeding of jack 10 has been again reversed and piston 11 has released the shears 13.

The cutting device 17 is then ready to perform a second operating cycle as soon as the end of tube 1 acts again on the feeling device 31.

As it appears from the above description, the cutting device can be embodied for cutting tubular elements of different lengths, since it is just necessary to set the position of the stop 24, block 29 and stop 39 to determine the useful reciprocating motion of the sliding carriage 5 of which the maximum amplitude is determined by the maximum stroke of the jack 7. However, it is to be noted that in some cases said maximum amplitude can be altered up to the limit allowed by the interval between the cheeks 3, by setting the position of both the support 28 and bracket 8 and in such a case by substituting jack 7 by a jack having a higher stroke.

The invention is not restricted to the embodiment shown and described in detail for various modifications thereof can moreover be applied to it without departing from the scope of the invention and the spirit of the appended claims.

I claim:

1. Apparatus for cutting travelling tubing into lengths comprising a fixedly mounted frame, means on said frame for moving tubing along a path, a cutting unit slidably mounted on said frame, said cutting unit including a blade movable transversely of the path of the tubing and means including a cam member for moving said blade, an actuator fixedly mounted on said frame and located in the path of said tubing to be engaged therewith, a cylinder controlled by said actuator and connected to said cutting unit to move it along said tubing path at substantially the same speed, control means carried by said cutting unit and engaging said cam member during movement of said cutting unit, whereby said cam member operates said means moving the blade to cut a length of tubing, said actuator being constituted by a pivotally mounted two-arm lever provided with spring urged return means, the first arm of the lever being located in the path of said tubing, and the second arm of the lever having an abutment, and a push rod on said frame and resiliently urged against said abutment and maintaining control means of the cylinder, whereby the tubing causes the lever to pivot thus releasing said pushrod causing the control means of the cylinder to move said cylinder along said tubing path.

2. Apparatus as claimed in claim 1 wherein the cam member is slidably adjusted on the frame whereby engagement of the control means carried by the cutting unit with said cam member is made after a given length of tubing has passed through the cutting unit thus adjusting the length of tubing to be cut.

3. Apparatus as set forth in claim 1 further comprising a second cylinder as means for moving said blade.

4. Apparatus as claimed in claim 1 wherein the cutting unit further comprises gripping means for holding the tubing.

5. Apparatus as claimed in claim 1 further comprising a first block adjustably carried by said cylinder, a second block adjustably carried by said push-rod and engageable by said first block whereby at an adjustable time engagement of said second block by said first block causes the push-rod to move in a direction inverse to urging direction of the push-rod, the control means of the cylinder moving said cylinder in a direction inverse to travelling direction of said tubing and the abutment of the lever abutting against the push rod to maintain the lever engageable by said tubing.

* * * * *